US008999410B2

(12) United States Patent
Donaire et al.

(10) Patent No.: US 8,999,410 B2
(45) Date of Patent: Apr. 7, 2015

(54) CHEWING GUM CONTAINING STYRENE-DIENE BLOCK COPOLYMERS

(75) Inventors: Pere Ruiz Donaire, Barcelona (ES); Roser Amposta Estruch, Barcelona (ES); Joo H. Song, Chicago, IL (US)

(73) Assignee: WM. Wrigley Jr. Company, Chicago, IL (US)

( * ) Notice: Subject to any disclaimer, the term of this patent is extended or adjusted under 35 U.S.C. 154(b) by 2253 days.

(21) Appl. No.: 11/614,142

(22) Filed: Dec. 21, 2006

(65) Prior Publication Data

US 2007/0172541 A1    Jul. 26, 2007

Related U.S. Application Data

(60) Provisional application No. 60/754,987, filed on Dec. 29, 2005.

(51) Int. Cl.
*A23G 4/00* (2006.01)
*A23G 4/08* (2006.01)

(52) U.S. Cl.
CPC ........................................ *A23G 4/08* (2013.01)

(58) Field of Classification Search
None
See application file for complete search history.

(56) References Cited

U.S. PATENT DOCUMENTS

| | | | |
|---|---|---|---|
| 3,526,606 A * | 9/1970 | Fujimoto et al. ............... 523/200 |
| 3,984,574 A | 10/1976 | Comollo |
| 4,212,910 A * | 7/1980 | Taylor et al. .................. 428/36.8 |
| 4,352,823 A | 10/1982 | Cherukuri et al. |
| 4,387,108 A | 6/1983 | Koch et al. |
| 4,452,820 A | 6/1984 | D'Amelia et al. |
| 4,489,099 A | 12/1984 | Shaheen et al. |
| 4,500,547 A | 2/1985 | Puglia et al. |
| 4,588,592 A | 5/1986 | Elias |
| 4,780,324 A | 10/1988 | Knebl et al. |
| 4,794,003 A | 12/1988 | Cherukuri et al. |
| 4,804,543 A | 2/1989 | Dokuzovic et al. |
| 4,963,369 A * | 10/1990 | Song et al. ......................... 426/5 |
| 5,015,467 A | 5/1991 | Smitherman |
| 5,059,428 A | 10/1991 | Wong et al. |
| 5,066,511 A | 11/1991 | Cherukuri et al. |
| 5,093,136 A | 3/1992 | Panhorst et al. |
| 5,139,787 A * | 8/1992 | Broderick et al. ............. 424/486 |
| 5,153,011 A | 10/1992 | Patel et al. |
| 5,154,927 A * | 10/1992 | Song et al. ...................... 424/440 |
| 5,154,938 A | 10/1992 | Broderick et al. |
| 5,158,790 A | 10/1992 | Witkewitz et al. |
| 5,204,129 A | 4/1993 | Cherukuri et al. |
| 5,266,336 A | 11/1993 | McGrew et al. |
| 5,334,397 A | 8/1994 | Ream et al. |
| 5,397,580 A | 3/1995 | Song et al. |
| 5,419,919 A | 5/1995 | Song et al. |
| 5,436,013 A | 7/1995 | Synosky et al. |
| 5,437,878 A | 8/1995 | Panhorst et al. |
| 5,458,890 A | 10/1995 | Williford et al. |
| 5,458,981 A | 10/1995 | Abe et al. |
| 5,651,936 A | 7/1997 | Reed et al. |
| 5,747,568 A | 5/1998 | Fischer et al. |
| 6,086,925 A | 7/2000 | Song et al. |
| 6,180,144 B1 | 1/2001 | Hill et al. |
| 6,231,896 B1 | 5/2001 | Ford et al. |
| 6,235,319 B1 | 5/2001 | Schulz et al. |
| 6,238,710 B1 | 5/2001 | Song et al. |
| 6,399,721 B2 | 6/2002 | Schulz et al. |
| 6,583,228 B2 | 6/2003 | Nkansah et al. |
| 6,818,236 B2 | 11/2004 | Hill et al. |
| 6,852,345 B2 | 2/2005 | Hill et al. |
| 6,858,237 B1 | 2/2005 | Wolfe et al. |
| 6,972,309 B1 | 12/2005 | Wideman et al. |
| 7,070,818 B1 | 7/2006 | Nielsen et al. |
| 2002/0115744 A1 * | 8/2002 | Svenningsen et al. ........ 523/122 |
| 2002/0161156 A1 | 10/2002 | Nkansah et al. |
| 2003/0124220 A1 | 7/2003 | Hill et al. |
| 2004/0018223 A1 * | 1/2004 | Chen ............................. 424/439 |
| 2006/0229411 A1 * | 10/2006 | Hatfield et al. .................. 525/88 |
| 2006/0240144 A1 | 10/2006 | Shalaby et al. |
| 2007/0042078 A1 | 2/2007 | Miladinov et al. |
| 2007/0042079 A1 | 2/2007 | Miladinov et al. |
| 2011/0111084 A1 * | 5/2011 | Neergaard ......................... 426/5 |

FOREIGN PATENT DOCUMENTS

| | | | |
|---|---|---|---|
| EP | 0239540 A2 | 9/1987 |
| EP | 0252874 A2 | 1/1988 |
| EP | 0265386 A2 | 4/1988 |
| EP | 0271445 A2 | 6/1988 |
| EP | 0279776 A2 | 8/1988 |
| EP | 0297048 A2 | 12/1988 |
| EP | 0298038 A1 | 4/1989 |
| EP | 0314617 A1 | 5/1989 |
| EP | 0298922 A2 | 11/1989 |
| EP | 0398465 A2 | 11/1990 |
| EP | 0438912 A2 | 7/1991 |
| EP | 0561735 A1 | 9/1993 |
| EP | 0627886 B1 | 12/1994 |
| EP | 0633729 B1 | 1/1995 |
| WO | 9002490 A1 | 3/1990 |
| WO | 9107101 A1 | 5/1991 |
| WO | 9115105 A2 | 10/1991 |
| WO | 9200060 A1 | 1/1992 |
| WO | 9202149 A1 | 2/1992 |
| WO | 9217579 A1 | 10/1992 |

(Continued)

OTHER PUBLICATIONS

Solprene 416. IDES information sheet. Last updated Jan. 1, 2008. Downloaded from IDES Sep. 1, 2010.*

(Continued)

*Primary Examiner* — Nikki H Dees
(74) *Attorney, Agent, or Firm* — Gordon N. McGrew

(57) ABSTRACT

The present invention relates generally to a chewing gum composition, as well as methods for the preparation thereof. More specifically, the present invention relates to a gum base, as well as a chewing gum composition prepared therefrom, which contain a styrene-diene block copolymer, such as a styrene-butadiene block copolymer.

13 Claims, No Drawings

(56) References Cited

FOREIGN PATENT DOCUMENTS

| | | |
|---|---|---|
| WO | 9309678 A1 | 5/1993 |
| WO | 9317578 A1 | 9/1993 |
| WO | 9317579 A1 | 9/1993 |
| WO | 9401002 A1 | 1/1994 |
| WO | 9414330 A1 | 7/1994 |
| WO | 9527405 A1 | 10/1995 |
| WO | 9701962 A1 | 1/1997 |
| WO | 9724036 A1 | 7/1997 |
| WO | 9740083 A1 | 10/1997 |
| WO | 9837112 A1 | 8/1998 |
| WO | 0147368 A1 | 7/2001 |
| WO | 0176384 A1 | 10/2001 |
| WO | 0177228 A1 | 10/2001 |
| WO | 02069729 A1 | 9/2002 |
| WO | 02071860 A1 | 9/2002 |
| WO | 2006063189 A2 | 6/2006 |
| WO | 2007076856 A1 | 7/2007 |

OTHER PUBLICATIONS

Kraton 1101. IDES information sheet. Last updated Apr. 7, 2010. Downloaded from IDES Sep. 1, 2010.*

Kraton 1102. Data document. Apr. 28, 2010. Downloaded from www.kraton.com Sep. 1, 2010.*

Kraton 1101A. Data document. Aug. 26, 2009. Downloaded from www.kraton.com Sep. 1, 2010.*

Kraus, G. et al., "Properties of Random and Block Copolymers of Butadiene and Styrene. I. Dynamic Properties and Glassy Transition Temperatures", Journal of Applied Polymer Science, (1967), pp. 1581-1591, vol. 11.

Kraus, G. et al., "Properties of Random and Block Copolymers of Butadiene and Styrene. II. Melt Flow", Journal of Applied Polymer Science, (1967), pp. 2121-2129, vol. 11.

Bauer, R.G., "Elastomers, Synthetic—Styrene-Butadiene Rubber", Kirk-Othmer, pp. 608-625, 3rd Ed., vol. 8.

Weissert F.C. et al., "Structural Characteristics of Alkyllithium Catalyzed Polymers Derived from Butadiene and Styrene", Rubber Chemistry and Technology, (1967), pp. 590-601, vol. 40:2.

Oppanol B Types, Oppanol B 10 SFN, Oppanol B 11 SFN, Oppanol B 12 SFN, Oppanol B 13 SFN, Oppanol B 15 SFN, BASF Aktiengesellschaft, Performance Chemicals for Automotive and Oil Industry, TI/ES 1482 US, (2003), pp. 1-8.

Oppanol B 100, Oppanol B 150, Oppanol B 200, BASF Aktiengesellschaft, Performance Chemicals for Automotive and Oil Industry, TI/ES 1417 US, (2003), 10 pages.

BASF Has Acquired ExxonMobil Chemical's Vistanex LM Polyisob, Leading-Edge Production Ensures Superior Quality, BASF The Chemical Company, http://www.basf.com/corporate/news2003/newsinfo_oppanal_051203.html, (2006).

Glissopal V220, V 500 and V 1500, BASF Aktiengesellschaft, Performance Chemicals for Automotive and Oil Industry, DI/ES 069 e US, (2003), pp. 1-4.

Glissopal 1000, 1300 and 2300, BASF Aktiengesellschaft, Performance Chemicals for Automotive and Oil Industry, TI/ES 1186 e US, (2003), 8 pages.

Vistanex Polyisobutylene Properties & Applications, ExxonMobil Chemical Company, (2003), pp. 1-25.

Oppanol B Types, Oppanol B 30 SF, Oppanol B 50/B 50 SF, Oppanol B 80, BASF Aktiengesellschaft, Performance Chemicals for Automotive and Oil Industry, TI/ES 1415 US, (2003), pp. 1-11.

English Language Abstract of CN 1127075, 1996.

International Search Report and Written Opinion issued in connection with PCT/US2006/062455, dated Jun. 15, 2007.

* cited by examiner

# CHEWING GUM CONTAINING STYRENE-DIENE BLOCK COPOLYMERS

REFERENCE TO RELATED APPLICATION

This application claims the benefit of U.S. Provisional Application Ser. No. 60/754,987, filed Dec. 29, 2005, the entire contents of which are incorporated herein by reference.

FIELD OF THE INVENTION

The present invention relates generally to a chewing gum composition, as well as methods for the preparation thereof. More specifically, the present invention relates to a gum base, as well as a chewing gum composition prepared therefrom, which contain a styrene-diene block copolymer, such as a styrene-butadiene block copolymer.

SUMMARY OF THE INVENTION

Accordingly, the present invention is directed to a gum base comprising an elastomer and an elastomer plasticizer, wherein the elastomer comprises a styrene-diene block copolymer, as well as a chewing gum comprising this gum base. The present invention is particularly directed to such a gum base wherein the styrene-diene block copolymer is a block copolymer of styrene and butadiene. The present invention is also particularly directed to such a gum base which comprises a polymer blend of a styrene-diene block copolymer and another elastomer such as styrene-diene random copolymer.

The present invention is further directed to a method for preparing a gum base as detailed herein above. In one particular embodiment, the present invention is directed to a method of making chewing gum base which comprises: providing a mixer; providing an elastomer to the mixer, wherein the elastomer comprises a styrene-diene block copolymer; providing a plasticizer to the mixer; and mixing the ingredients in the mixer to produce a gum base. Such a process may be carried out in a batch manner or a continuous process wherein all addition and compounding steps are performed using a single continuous mixing apparatus.

The present invention is further directed to a chewing gum comprising a water soluble gum portion and a water insoluble gum base portion, wherein the gum base portion is as detailed herein above. The present invention is still further directed to a method for preparing such chewing gums. More particularly, a method for producing a chewing gum of the present invention may comprise the steps of: a) providing a gum base to a mixer, wherein the gum base comprises an elastomeric component and wherein the elastomeric component comprises a styrene-diene block copolymer; b) providing a plasticizer to the mixer; c) providing a sweetener to the mixer; d) providing a flavoring agent to the mixer; e) mixing the ingredients to form a chewing gum product.

Additional features and advantages of the present invention are described in, and will be apparent from, the Detailed Description of the Invention.

DETAILED DESCRIPTION OF THE INVENTION

The present invention provides improved chewing gum compositions, gum bases for making chewing gum compositions, and methods for the preparation thereof. Pursuant to the present invention, gum bases are provided which comprise a styrene-diene block copolymer elastomer, particularly a styrene butadiene block copolymer elastomer, combined or not with another elastomer, such as, a styrene-diene random copolymer.

Without being held to a particular theory, it is believed that the use of a styrene-diene block copolymer as the elastomeric component of a gum base may be advantageously used to reduce mixing times, elastomer content, and/or energy costs in gum base production, using for example batch mixers, as their viscosity decreases substantially above 100° C. In comparison to styrene-diene random copolymers, such as styrene-butadiene random copolymers, styrene-diene block copolymers may also be processed easier in a mixer-extruder, which are used for example in a continuous process for the production of a gum base and/or chewing gum. It is also believed that such polymers may yield gum bases with special melting properties that may be used in deposited or molded chewing gum products.

I. Gum Base

Thermoplastic elastomers (TPEs), such as styrene-diene block copolymers, are a rubbery material with properties and functional performance very similar to those of a vulcanized conventional rubber, yet they can be fabricated in the molten state as a thermoplastic. Above its softening point, a TPE is fluid and can be molded or extruded with the same equipment and methods as commonly employed for thermoplastics. Below its softening point, a TPE functions as a flexible, elastic rubber. Commercially available TPE block copolymers have two polymeric phases and two glass transitions temperatures: a soft rubbery one and a hard thermoplastic one. Additionally, TPE block copolymers generally fall into one of three categories: (i) block copolymers with alternating soft and hard segments, (ii) blends of a rubbery polymer and thermoplastic, and (iii) rubbery polymer-thermoplastic compositions in which the former is highly vulcanized and finely dispersed in the latter. Currently used random SBR copolymers have only one phase and one glass transition temperature. In addition, TPE Block copolymers are much tougher than the unvulcanized random SBR, which is used in gum base.

Commercially, styrene-diene block copolymers are the largest-volume category of thermoplastic elastomers. Being thermoplastic elastomers, styrene-diene block copolymers advantageously possess the mechanical properties of rubbers, and the processing characteristics of thermoplastics. These properties and characteristics are related to the molecular structure of the copolymer. For example, some of the simplest types of styrene-diene block copolymers consist of at least three blocks; namely, two hard polystyrene end blocks and one soft, elastomeric midblock.

Accordingly, the present invention is directed to the use of styrene-diene block copolymers in the preparation of a gum base. More particularly, the present invention is directed to a gum base which comprises a styrene-diene block copolymer having two or more hard segments or blocks of polystyrene and at least one soft, or comparatively more flexible, segment or block of, for example, a polydiene, such as a polybutadiene or polyisoprene, there between.

It is to be noted that, as used herein, "block copolymer" generally refers to a polymer comprising at least two segments or blocks of differing composition, having any one of a number of different architectures, where the monomers are not incorporated into the polymer architecture in a solely statistical or uncontrolled manner. In some embodiments, the block copolymer may have an A-B architecture (with "A" and "B" representing the monomers). Other architectures included within the definition of block copolymer include, for example, A-B-A, A-B-A-B, A-B-C, A-B-C-A, A-B-C-A-B, A-B-C-B, A-B-A-C (with "C" representing a third monomer), and other combinations that will be obvious to those of skill in the art. As further noted elsewhere herein, the styrene-diene block copolymers of the present invention may optionally be mixed with one or more styrene-diene random copolymers (e.g., styrene butadiene random copolymer). Thus, the polymer of the present invention may optionally have an architecture of, for example, A-B-J, J-A-B, A-B-A-J, J-A-B-A, A-J-B-A-B, A-J-B-J-C, etc., where J is a random block of, for example, monomers A and B or of monomers B and C.

It is to be further noted that, as used herein, each "block" within the scope of the block copolymers of this invention may typically comprise about 10 to several hundred of the same monomer segment. Optionally, the number of monomers within a single block may be about 15, about 20, about 30, about 40, about 50 or more.

In one preferred embodiment, the block copolymer utilized in the present invention comprises three or more blocks, wherein a midblock thereof is a soft or more flexible block, of for example polybutadiene, as compared for example to the hard or less flexible outer or terminal blocks of polystyrene. Optionally, the flexible midblock, or diene portion, of the copolymer may be partially or fully hydrogenated, in order to increase stability by reducing oxidation. Commonly, antioxidants are used to give oxidation stability.

The block copolymers of the present invention may be linear, such as for example in the case of styrene-diene-styrene triblock copolymers. Rather more complex structures may also be employed, such as "radial" type of block copolymers. These types of copolymers consist of three or more chains or arms of, for example, styrene-butadiene diblock copolymers radiating from a center hub. In each diblock, the butadiene portion is innermost, or closest to the center hub, and the styrene portion forms the terminal blocks.

Without being held to a particular theory, the block copolymers of the present invention are believed to be advantageous, as compared to random styrene butadiene copolymers for example, because they possess the ability to behave like a cross linked elastic rubber at room temperatures. This ability is generally due to the molecular incompatibility of the diene (e.g., butadiene) and styrene repeating units. As a result, these segments or blocks within each polymer chain tend to phase separate into domains which are rich in styrene units and domains rich in diene (e.g., butadiene) units. Since the styrene domains are below their glass transition temperature ($T_g$), they behave like cross linking points that bind the polydiene (e.g., polybutadiene) segments or blocks into an indefinitely large molecular network, and thus increase elastic strength at low temperatures. However, upon raising the temperature of the polymer chains above the $T_g$ of polystyrene, which is about 100° C., the polystyrene domains disassociate or disintegrate, and the styrene-diene block copolymer becomes processable as a thermoplastic, the melt viscosity being comparable to that of thermoplastic materials like polystyrene and polypropylene. Upon subsequent cooling, phase separation occurs again to some degree, enabling the styrene-diene block copolymer to once again exhibit good elastomeric qualities.

Unlike random styrene butadiene copolymers, which are obtained by aqueous emulsion polymerization (see, e.g., U.S. Pat. Nos. 6,818,236, 6,399,721 and 6,235,319, the entire contents of which are incorporated herein by reference for all relevant purposes), styrene-diene block copolymers of the present invention may be obtained by solvent polymerization. Solvent polymerization techniques are known in the art and include, for example, anionic polymerization with an organometallic catalyst, such as butyl lithium, an initiator, of which there are two types—a difunctional initiator like sodium naphthalene and a monofunctional initiator like an alkyl lithium, and a suitable solvent. The resulting polymer can be purified by different processes known in the art, such as drum drying, steam stripping or solvent removal in a vacuum extruder. Purification is utilized to remove monomers, catalyst, and solvent.

Generally speaking, the various properties (e.g., molecular weight, polydispersity, viscosity, etc.) of the styrene-diene block copolymers suitable for use in accordance with the present invention may be controlled using techniques known in the art, in order to optimize them for a given chewing gum product in which the gum base is to be used. Typically, however, these polymers may have a number average molecular weight of about 100,000 daltons, about 150,000 daltons, about 200,000 daltons, about 250,000 daltons, about 300,000 daltons, or more, the molecular weight ranging for example from about 100,000 to about 300,000 daltons, or from about 150,000 to about 250,000 daltons. Additionally, the polymers of the present invention may have a polydispersity of greater than about 1 and less than about 2. For example, the polydispersity of these polymers may be in the range of greater than about 1.02 to about 1.10.

The composition of styrene-diene block copolymers suitable for use in accordance with the present invention may also be controlled using techniques known in the art, in order to optimize them for a given chewing gum product in which the gum base is to be used. For example, the styrene-diene block copolymers of the present invention may have a total styrene concentration therein of greater than about 10 weight percent, about 15 weight percent, about 20 weight percent, about 30 weight percent, about 40 weight percent or more, the concentration being in the range of for example about 15 weight percent to about 40 weight percent, or preferably about 20 weight percent to about 35 weight percent, based on total weight of the polymer.

A number of potentially suitable styrene butadiene copolymers are commercially available. Such polymers include, for example, Calprene 401 and Solprene S-4318 which are commercially available from Dynasol. Calprene 401 is a radial styrene-diene block copolymer having: (i) a total styrene concentration of about 20 weight percent; (ii) a melt flow index (determined using means known in the art) at 190° C. that is less than about 1; (iii) a toluene solution viscosity (25 weight percent) (determined using means known in the art) of about 9.7 Pa·s; and (iv) a Shore A hardness value (determined using means known in the art) of about 60. Solprene S-4318 is a linear styrene-diene block copolymer having: (i) a total styrene concentration of about 32 weight percent; (ii) a melt flow index at 190° C. of about 8; (iii) a toluene solution viscosity (25 weight percent) of about 0.685 Pa·s; and (vi) a Shore A hardness value of about 69.

As noted elsewhere herein, it has been discovered that styrene-diene block copolymers are particularly well-suited for use as the elastomeric component of a chewing gum base. Optionally, these block copolymers may be used in combination with another elastomer such as, for example, smoked or liquid latex and guayule, jelutong, lechi caspi perillo, massaranduba, balata, massaranduba chocolate, nispero, rosidinha, chicle, gutta percha, gutta kataiu, niger gutta, tunu, chilte, chiquibul, gutta hang kang, styrene-diene random copolymer, polyisobutylene, isobutylene-isoprene copolymers, and mixtures thereof. Accordingly, in an alternatively preferred embodiment, the elastomer component of the present invention may be a blend of styrene-diene block copolymers and styrene-diene random copolymers, for example styrene butadiene block copolymer may be blended with styrene butadiene random copolymer. Alternatively, using techniques known in the art, the polymer may be formed such that it contains both segments or blocks of styrene and diene (e.g., butadiene) polymers, as well as segments or blocks of styrene-diene random (e.g., butadiene) copolymer therein.

In one preferred embodiment, the elastomeric component in the gum base is about 100 weight percent styrene-diene block copolymer. Alternatively, however, the elastomeric component may be a blend of a styrene-diene block copolymer and another polymer, such as a styrene-diene (e.g., butadiene) random copolymer. In such embodiments, the concentration of the styrene-diene block copolymer in the elastomer may be between about 25 weight percent and less than about 99 weight percent, with about 50 weight percent to less than about 99 weight percent or about 75 weight percent to less about 99 weight percent being preferred. Therefore, the concentration of the other polymer, such as the styrene-diene random copolymer, in the elastomer is typically between about 1 weight percent and about 75 weight percent, with about 1 weight percent to about 50 weight percent, or about 1 weight percent to about 25 weight percent, being preferred.

Typically, composition of the elastomer will be controlled in order to optimize the thermal and/or physical properties for the desired end use (e.g., gum base and/or chewing gum properties). Typically, however, with respect to the thermal, as well as physical, properties of the elastomeric component of the gum base of the present invention, it is to be noted that these elastomers may have a melt flow index (MFI) (determined using means known in the art), at about 190° C., that is in the range of about 0.01 g/10 minutes to about 40 g/10 minutes, or about 0.1 g/10 minutes to about 30 g/10 minutes, or even about 0.5 g/10 minutes to about 20 g/10 minutes. These or other elastomers of the present invention may further have a softening point (determined using means known in the art) that is in the range of about 95° C. to about 105° C.

These or other elastomers of the present invention may still further have a toluene solution viscosity (25 weight percent) (determined using means known in the art) that is in the range of about 0.5 Pa·s to about 25 Pa·s, or about 0.6 Pa·s to about 10 Pa·s, as determined using means known in the art. Finally, these or other elastomers of the present invention may have a Shore A hardness value (determined using means known in the art) that is in the range of about 55 to about 85, and preferably about 60 to about 70.

Regardless of the composition of the elastomer used in the gum base of the present invention, it is to be noted that the usage level thereof in the gum base may be dependent on a number of factors, including for example the overall base composition and the desired characteristics of the gum base and/or the final chewing gum product. Additionally, the gum base may include, in addition to the elastomer, one or more of the following: plasticizers; fillers; softeners; waxes; anti-oxidants; colorants; flavors; bulk sweeteners; high intensity sweeteners; and/or emulsifiers; as well as other components that provide desired attributes.

Typically, however, the amount of elastomer (e.g., styrene-diene block copolymer, or a blend of styrene-diene block copolymer and styrene-diene random copolymer) present in the gum base of the present invention is between about 1 weight percent and about 30 weight percent. More appropriately, the amount of the polymer in the gum base of the present invention is between about 2 weight percent and about 15 weight percent or between about 4 weight percent and about 12 weight percent. As for the additional additives or components, it is to be noted that the determination of which of these to use, as well as the amount thereof, may be achieved using means known in the art.

Elastomer plasticizers may be used to vary the firmness of the gum base. Their polymer plasticizing strength and their varying softening points may cause varying degrees of finished gum firmness when used in gum base. This may be an important consideration when one wants to use flavors that differ in plasticizing strength of the gum base in finished gum. The elastomer plasticizers suitable for use in the present invention include, but are not limited to, natural rosin esters such as glycerol ester of partially hydrogenated rosin, glycerol ester of polymerized rosin, glycerol ester of partially dimerized rosin, glycerol ester of gum rosin, glycerol ester of tall oil rosin, glycerol ester of wood rosin, pentaerythritol esters of partially hydrogenated rose, partially hydrogenated methyl esters of rosin, pentaerythritol ester of rosin, synthetic elastomer plasticizers such as terpene resins derived from α-pinene, β-pinene, d-limonene and/or dipentene and mixtures thereof. Such plasticizers are typically present in the gum base at a concentration of from about 10 weight percent to about 90 weight percent, or from about 20 weight percent to about 80 weight percent, based on the total weight of the gum base.

Plasticizers are sometimes referred to as softeners (but are not to be confused with water soluble softeners used in the bulking portion of the gum). Typically these include fats and oils as well as waxes. Fats and oils are typically vegetable oils which are normally partially or fully hydrogenated to increase their melting point. Vegetable oils suitable for such use include oils of cottonseed, soybean, palm (including palm kernel), coconut, shea, castor, peanut, corn, rapeseed, canola, sunflower, cocoa and others. Less commonly used are animal fats such as milk fat, tallow and lard. Structured fats, which are essentially synthetically compounded glycerol esters (triglycerides) of fatty acids of varying chain lengths, offer an ability to carefully adjust the softening profile by use of short and medium chain fatty acids which are less commonly found in nature. Commonly employed waxes include paraffin, microcrystalline and natural waxes such as beeswax and carnauba. Microcrystalline waxes, especially those with a high degree of crystallinity, may be considered bodying agents or textural modifiers. Plasticizers are typically employed at a level of about 5% to 40% by weight of the gum base.

Plastic resins, such as polyvinyl acetate, which behave somewhat as plasticizers, are also commonly used. Other plastic polymers that may be used include polyvinyl laurate, polyvinyl alcohol, and polyvinyl pyrrolidone. Most gum bases incorporate polyvinyl acetate at a level of about 10% to about 35% by weight of the gum base.

The gum base typically also includes a filler component. The filler component is typically an inorganic powder such as calcium carbonate, magnesium carbonate, talc, dicalcium phosphate or the like. The filler may constitute between approximately 5% to about 50% by weight of the gum base. Occasionally, a portion of the filler may be added to the chewing gum mixture separately from the gum base.

Emulsifiers, which may also have plasticizing properties, assist in homogenizing the different base components. Commonly used emulsifiers include mono- and diglycerides such as glycerol monostearate, lecithin, and glycerol triacetate. Emulsifiers are commonly used at a level of about 2% to about 10% by weight of the gum base.

Gum bases commonly contain optional additives such as antioxidants and colors which serve their normal functions. Less commonly, flavors and sweeteners may be added to the gum base. These additives, if used, are typically employed at levels of about 1% or less by weight of the gum base.

The insoluble gum base may constitute between approximately 5% to about 95% by weight of the gum. Typically, the insoluble gum base may comprise between approximately 10% and about 50% by weight of the gum, or from approximately 20% to about 40% by weight of the gum. The present invention contemplates employing any commercially acceptable gum base.

The gum base of the present invention may be prepared using methods known in the art (e.g., batch or continuous methods of preparation).

For example, gum bases may typically be prepared by adding an amount of the elastomer component, elastomer solvent and filler to a heated sigma blade mixer with a front to rear speed ratio of typically about 2:1. The initial amount of ingredients is determined by the working capacity of the mixing kettle in order to attain a proper consistency. After the initial ingredients have massed homogeneously, the balance of the elastomer solvent, filler, softeners, etc. are added in a sequential manner until a completely homogeneous molten mass is attained. This can usually be achieved in one to three hours, depending on the formulation. The final mass temperature may typically be between about 70° C. and about 130° C., with a temperature between about 100° C. and about 120° C. being more typical. The completed molten mass is emptied from the mixing kettle into coated or lined pans, extruded or cast into any desirable shape and allowed to cool and solidify.

Continuous processes using mixing extruders, which are generally known in the art, may optionally be used to prepare the gum base. After the initial ingredients have massed homogeneously and have been compounded for the time desired, the balances of the base ingredients are added in a sequential manner until a completely homogeneous molten mass is attained. Typically, any remainder of elastomer and elastomer plasticizer are added after the initial compounding time. The optional waxes and the oils are typically added after the elastomer and elastomer plasticizer. Then the mass is allowed to become homogeneous before discharging for extrusion.

Exemplary methods of extrusion, which may optionally be used in accordance with the present invention, include the following, the entire contents of each being incorporated herein by reference: (i) U.S. Pat. No. 6,238,710, claims a method for continuous chewing gum base manufacturing, which entails compounding all ingredients in a single extruder; (ii) U.S. Pat. No. 6,086,925 discloses the manufacture of chewing gum base by adding a hard elastomer, a filler and a lubricating agent to a continuous mixer; (iii) U.S. Pat. No. 5,419,919 discloses continuous gum base manufacture using a paddle mixer by selectively feeding different ingredients at different locations on the mixer; and, (iv) yet another U.S. Pat. No. 5,397,580 discloses continuous gum base manufacture wherein two continuous mixers are arranged in series and the blend from the first continuous mixer is continuously added to the second continuous mixer. In an alternative continuous process, ingredients are added continuously at various points along the length of the extruder, in which case the transit time through the extruder could be substantially less than an hour.

II. Chewing Gum

Chewing gums of the present invention generally comprise a portion that is substantially insoluble in water, a portion that is substantially soluble in water, and one or more flavors. The water insoluble portion typically comprises the gum base of the present invention; that is, it comprises a plasticizer and a styrene-diene block copolymer or a blend of styrene-diene block copolymer and another elastomer such as, for example, a styrene-diene random copolymer. The water soluble portion dissipates with a portion of the flavor over a period of time during chewing, however, the gum base portion is retained in the mouth throughout the chew.

The amount of gum base used in the chewing gum of the present invention may depend on a number of factors, including for example the overall chewing gum composition and the desired characteristics of the final product. As noted previously, the level of gum base may be as little as 5 weight percent or as much as 95 weight percent of the gum, typically the amount of gum base in the final chewing gum product is between about 10 weight percent and about 50 weight percent. More typically, the level of gum base may be about 20 weight percent to about 40 weight percent, with an amount between about 15 weight percent and about 20 weight percent being preferred.

In addition to a water insoluble gum base portion, typical chewing gum compositions include a water soluble bulk portion. The water-soluble portion of the chewing gum may further comprise softeners, sweeteners, flavoring agents, and combinations thereof. The sweeteners often fulfill the role of bulking agents in the gum.

A. Bulking Agents

The major portion of the water soluble portion of the chewing gum will comprise a water-soluble carbohydrate which serves as a bulking agent. In sugar gums, this most often is sucrose, although other sugars such as fructose, erythrose, dextrose (glucose), levulose, tagatose, galactose, corn syrup solids and the like, alone or in any combination, may additionally or alternatively be used. Generally, sugarless chewing gums will employ sugar alcohols (also called alditols, polyols and polyhydric alcohols) as bulking agents due to their benefits of low cariogenicity, reduced caloric content and reduced glycemic values. Such sugar alcohols include sorbitol, mannitol, xylitol, hydrogenated isomaltulose, maltitol, erythritol, hydrogenated starch hydrolysate solids, and the like, alone or in any combination. Longer chain saccharides such as polydextrose, fructo-oligosaccharides are sometimes employed for their reduced caloric properties and other health benefits. Bulk sweeteners include both sugar and sugarless components. Bulk sweetener typically constitutes about 5% to about 95% by weight of the chewing gum, more typically, about 20% to about 80% by weight, and even more typically, about 30% to about 60% by weight of the chewing gum.

B. Softeners

Softeners are added to the chewing gum in order to optimize the chewability and mouth feel of the gum. Softeners, also known in the art as plasticizers or plasticizing agents, generally constitute between about 0.5 weight percent to about 15 weight percent of the chewing gum. These include glycerin, propylene glycol and aqueous sweetener solutions such as those containing sorbitol. Hydrogenated starch hydrolysate and corn or other starch hydrolysate syrups (sometimes called glucose syrups) and combinations thereof are particularly preferred, as they also function as binders to improve the flexibility and other physical properties of the gum.

C. High Intensity Sweeteners

High intensity sweeteners (which are sometimes called high potency or artificial sweeteners) may be defined as food acceptable chemicals which are at least about 20 times sweeter than sucrose. Commonly used high intensity sweeteners include aspartame, sucralose, and acesulfame-K. Less common are saccharin, thaumatin, alitame, neotame, cyclamate, perilla derived sweeteners, stevia derived sweeteners, monatin, monellin and chalcones. Usage levels for high intensity sweeteners may vary widely depending on the potency of the sweetener, local market preferences and the nature and level of other ingredients which might impart bitterness to the gum. Typical levels can range from about 0.01 weight percent to about 2 weight percent, although some applications may dictate usage outside that range.

D. Flavors

Flavors are employed to impart a characteristic aroma sensation to chewing gum products. Most flavors are water insoluble liquids or solids and may be natural or artificial (synthetic) in origin. Often natural and artificial flavors are combined. It is also common to blend different flavors together in pleasing combinations. Although the range of flavors usable in chewing gums is nearly limitless, they commonly fall into several broad categories. Fruit flavors include lemon, orange, lime, grapefruit, tangerine, strawberry, apple, cherry, raspberry, blackberry, blueberry, banana, pineapple, cantaloupe, muskmelon, watermelon, grape, currant, mango, kiwi and many others as well as combinations thereof. Mint flavors include spearmint, peppermint, wintergreen, basil, corn mint, menthol and mixtures thereof. Spice flavors include cinnamon, vanilla, clove, chocolate, nutmeg and many others. Less commonly used are herbal and savory flavors such as popcorn, chili, corn chip and the like. Typical levels can range from about 0.1 weight percent to about 10 weight percent. More typically, the levels may be about 0.5 weight percent to about 3 weight percent, although some applications may dictate usage outside that range.

E. Emulsifiers

Emulsifiers may also be used to modify the texture and cause the hydrophobic and hydrophilic components of the base/chewing gum to be miscible. Emulsifiers suitable for use in the present invention include, but are not limited to, glycerol monostearate, glycerol triacetate, lecithin, mono- or di-glycerides, acetylated mono- or di-glycerides, and distilled mono- or di-glycerides.

F. Encapsulation

In order to provide longer lasting sweetness and flavor perception, it may be desirable to encapsulate or otherwise control the release of at least a portion of the artificial sweetener. Such techniques as wet granulation, wax granulation, spray drying, spray chilling, fluid bed coating, coacervation, and fiber extrusion may be used to achieve the desired release characteristics.

It is to be noted that chewing gums of the present invention may advantageously have lower viscosity at high temperatures (e.g., about 80 to about 130° C.), compared with chewing gums made with bases containing non-thermoplastic or standard rubber; for example, the chewing gums of the present invention may have a viscosity at 100° C. of less than about 5.0 Pa·s. This reduced viscosity make these chewing gums especially suitable for molded/casted gums, or gums produced by any other processes that require low viscosity. Presently, gums having a comparable viscosity are prepared using standard bases by reducing the concentration of the elastomer in the base, and/or increasing the amount of plasticizer in the base. In both cases, the resulting gum has the negative characteristics of a less "rubbery" more "waxy" or "plastic" chewing texture.

III. Preparation

Chewing gums of the present invention may be prepared using methods know in the art. For example, as disclosed in U.S. Pat. No. 6,858,237, chewing gums of the present invention may be prepared by a continuous process comprising the steps of: a) adding a gum base into a high efficiency continuous mixer; b) adding at least one sweetener and at least one flavor into the continuous mixer, and mixing said sweetener and flavor with the remaining ingredients to form a chewing gum product; and c) wherein after one of the ingredients is added to the mixer, it is subjected to a conveyor element on a screw of a single high efficiency continuous mixer.

More typically, chewing gum is made by a batch process using a Sigma blade mixer to prepare chewing gum formulations. This method of manufacturing chewing gum according to the present invention is by sequentially adding the various chewing gum ingredients to any commercially available mixer known in the art. After the ingredients have been thoroughly mixed, the gum is discharged from the mixer and shaped into the desired form such as rolling into sheets and cutting into sticks, extruding into chunks, or casting into pellets.

Generally, the ingredients are mixed by first melting the gum base and adding it to the running mixer. The base may also be melted in the mixer itself. Colors and emulsifiers may also be added at this time. Softeners may be added to the mixer at this time, along with the syrup and a portion of the bulking agent. Flavor is typically added with the final portion of the bulking agent. Other optional ingredients are added to the batch in a typical fashion, well known to those of ordinary skill in the art.

The present invention is further illustrated by the following Example. This Example is not to be regarded as limiting the scope of the invention or the manner in which it may be practiced.

IV. Example

A. Gum Base Compositions

Two different commercially available styrene-diene block copolymers were tested: (i) Calprene 401: an 80/20 Butadiene/Styrene thermoplastic block copolymer, polymerized in solution and having a radial structure; and (ii) Solprene S-4318: a linear block copolymer of styrene and butadiene having 32% of styrene content, most of it forming a polystyrene block which gives the polymer a thermoplastic behavior.

Table 1 below shows the compositions of five gum bases that were tested. Laboratory mixing times were monitored and compared with mixing times required for standard rubbers. Some of the gum bases were analyzed (Table 2) and bubble gum compositions were prepared and chewed using these bases (Table 3).

TABLE 1

BASE COMPOSITIONS (WEIGHT PERCENTAGES)

| | Inventive Base 1 | Inventive Base 2 | Inventive Base 3 | Comparative Base 1 | Comparative Base 2 |
|---|---|---|---|---|---|
| Calprene 401 | 8.50 | | 6.00 | | |
| Solprene S-4318 | | 8.50 | | | |

TABLE 1-continued

BASE COMPOSITIONS (WEIGHT PERCENTAGES)

| | Inventive Base 1 | Inventive Base 2 | Inventive Base 3 | Comparative Base 1 | Comparative Base 2 |
|---|---|---|---|---|---|
| SBR rubber 75:25 | | | | 8.50 | |
| SBR rubber 50:50 | | | | | 8.50 |
| Ester Gum (Glycerol Ester of Gum Rosin) | 37.0 | 37.0 | 35.0 | 37.0 | 37.0 |
| 1:1 Blend of Paraffin waxes with Drop Melting Points of about 58° C. and about 64° C. | 6.50 | 6.50 | 11.0 | 6.50 | 6.50 |
| Emulsifier (Blend of Mono-diglyceride (2.75%) and Lecithin (0.18%) | 2.93 | 2.93 | 2.93 | 2.93 | 2.93 |
| Ground Limestone | 45.0 | 45.0 | 45.0 | 45.0 | 45.0 |
| Antioxidant (BHT) | 0.07 | 0.07 | 0.07 | 0.07 | 0.07 |
| Total | 100.0 | 100.0 | 100.0 | 100.0 | 100.0 |

TABLE 2

BASE PROPERTIES

| | Inventive Base 1 | Inventive Base 2 | Comparative Base 1 | Comparative Base 2 |
|---|---|---|---|---|
| Drop Point (softening point) (° C.) | 62.3 | 63.9 | 67.7 | 66.0 |
| Penetration at 37° C. (1/10 mm) | 66 | 64 | 98 | 71 |
| Total Shear Modulus \|G\| at 40° C. (1) (Pa) | $6.0 \times 10^5$ | $4.8 \times 10^5$ | $3.0 \times 10^5$ | $3.5 \times 10^5$ |
| Loss Factor tan(delta) at 40° C. (1) | 1.02 | 1.37 | 1.24 | 1.37 |
| Total Shear Modulus \|G\| at 80° C. (2) (Pa) | $3.0 \times 10^3$ | $1.2 \times 10^3$ | $2.0 \times 10^3$ | $2.0 \times 10^3$ |
| Loss Factor tan(delta) at 80° C. (2) | 5.5–6.5 | >9.0 | 2.2–2.3 | 2.4–2.6 |

(1) PHYSICA Rheometer SM-KP measuring unit with Rheolab MC-120. Parallel plate MP30 (d = 25 mm). Deformation (gamma) = 0.5%. Frequency = 1 Hz.
(2) PHYSICA Rheometer SM-KP measuring unit with Rheolab MC-120. Parallel plate MP30 (d = 25 mm). Deformation (gamma) = 20%. Frequency = 0.8 Hz.

TABLE 3

GUM COMPOSITIONS (WEIGHT PERCENTAGES)

| | Inventive Gum 1 | Inventive Gum 2 | Inventive Gum 3 | Comparative Gum 1 | Comparative Gum 2 |
|---|---|---|---|---|---|
| Inventive Base 1 | 18.0 | | | | |
| Inventive Base 2 | | 18.0 | | | |
| Inventive Base 3 | | | 18.0 | | |
| Comparative Base 1 | | | | 18.0 | |
| Comparative Base 2 | | | | | 18.0 |
| Glucose syrup 43° Be | 21.0 | 21.0 | 21.0 | 21.0 | 21.0 |
| Liquid flavor | 0.35 | 0.35 | 0.35 | 0.35 | 0.35 |
| Glycerin | 0.50 | 0.50 | 0.50 | 0.50 | 0.50 |
| Sugar | 60.15 | 60.15 | 60.15 | 60.15 | 60.15 |
| Total | 100.0 | 100.0 | 100.0 | 100.0 | 100.0 |

Blending rubber, resin (i.e., glycerol ester of gum rosin) and filler (i.e., ground limestone) in a laboratory mixer were done in about 20 minutes for inventive Base 1 and 2, (blending temperature approximately 120° C.), while it took about 35 minutes when a random styrene butadiene rubber was used (comparative Base 1 and 2). Considering that 15 minutes extra time was required in all cases to add plasticizers (i.e., paraffin waxes) and emulsifiers (i.e., mono-diglycerides and lecithin), total mixing time using a gum base comprising styrene-diene block copolymers was reduced 30% (35 minute total time instead of 50 minutes). In this regard it is to be noted, however, that the thermoplastic rubber tested herein was presented in pellet form, while standard random styrene butadiene rubber was in one piece blocks. This may contribute to mixing time reduction; a contribution that has not been quantified at this time.

Physical properties of these gum bases are given in Table 2. Rheometric results show that bases with thermoplastic rubbers (inventive Base 1 and inventive Base 2) are harder at 40° C. than reference bases (comparative Base 1 and comparative Base 2), as Total Shear Modulus \|G\| is higher at this temperature, but all four bases have similar plasticity-elasticity balance (similar Loss Factor values). At 80° C., Loss Factor values for both inventive bases are significantly higher than values for reference bases; this meaning that bases containing thermoplastic rubbers become more plastic (or less elastic) than bases containing standard random rubbers, as temperature increases. In case of inventive Base 2, its Total Shear Modulus |G| at 80° C. (1.2×10³) is below the values obtained for comparative Base 1 (2.0×10³) and comparative Base 2 (2.0×10³), this meaning that inventive Base 2 is softer at this temperature.

These results show that bases containing thermoplastic rubbers are hard and rubbery at temperatures around 40° C. (close to mouth temperature) and they become softer and more plastic when heated to temperatures around 80° C., more than bases containing standard random rubbers do.

This ability of the inventive bases to become softer and more plastic when increasing temperature would make them specially suited to produce chewing gums that are deposited or molded at high temperatures.

B. Chewing Gum Profiles

Inventive Gum 1 had a hard and rubbery chewing profile and surprisingly gave excellent bubbles which are larger in size than those obtained with a standard gum base (like Comparative Gum 2). Inventive Gum 2 also had a hard and rubbery chewing profile but bubble capacity was lower than Inventive Gum 1. Comparative Gum 1 had a soft, plastic chewing profile with poor bubble capacity. In fact, SBR 75:25 rubber is not used alone in bubble gum formulas, but blended with SBR 50:50. Comparative Gum 2 had a medium hard chew with equilibrated rubbery character and good bubbles. Comparative Gum 2 can be considered a typical bubble gum composition.

As the chewing profile of inventive Base 1 and inventive Base 2 were very rubbery, a new base composition (Inventive Base 3) was prepared, reducing the percentage of thermoplastic rubber and resin (glycerol ester of gum rosin) and increasing the amount of plasticizer (paraffin wax). Inventive Gum 3 had a texture that was very close to typical bubble gums (Comparative Gum 2), with the ability to give bubbles larger than average.

The present invention is not limited to the above embodiments and can be variously modified. The above description of the preferred embodiments, including the Example, is intended only to acquaint others skilled in the art with the invention, its principles, and its practical application so that others skilled in the art may adapt and apply the invention in its numerous forms, as may be best suited to the requirements of a particular use.

With reference to the use of the word(s) comprise or comprises or comprising in this entire specification (including the claims below), unless the context requires otherwise, those words are used on the basis and clear understanding that they are to be interpreted inclusively, rather than exclusively, and applicants intend each of those words to be so interpreted in construing this entire specification.

What is claimed is:

1. A chewing gum comprising:
a water soluble gum portion; and
a water insoluble base portion, wherein said base portion comprises an elastomer and an elastomer plasticizer, wherein said elastomer comprises a styrene-diene block copolymer, and wherein said styrene-diene block copolymer is present at a concentration of from about 2 weight percent to about 15 weight percent, based on total weight of said base portion.

2. The chewing gum of claim 1 wherein the styrene-diene block copolymer is styrene-butadiene block copolymer.

3. The chewing gum of claim 1 wherein the elastomer has a melt flow index at 190° C. of from about 0.5 g/10 minutes to about 20 g/10 minutes.

4. The chewing gum of claim 1 wherein the elastomer has a toluene solution viscosity (25 weight percent) of from about 0.5 Pa·s to about 25 Pa·s.

5. The chewing gum of claim 1 wherein the elastomer has a Shore A hardness of from about 60 to about 70.

6. The chewing gum of claim 1 wherein the styrene-diene block copolymer has a styrene content of about 20 weight percent to about 35 weight percent, based on total weight of the styrene-diene block copolymer.

7. The chewing gum of claim 1 wherein the elastomer plasticizer is present in the gum base at a concentration of from about 10 weight percent to about 90 weight percent, based on total weight of the gum base.

8. The chewing gum of claim 1 wherein the water insoluble base portion comprises between about 5 and about 50 weight percent filler.

9. The chewing gum of claim 1 wherein the elastomer has a total styrene concentration between about 15 and about 40 weight percent.

10. A chewing gum comprising:
a carbohydrate bulking agent in a concentration from about 5 weight percent to about 95 weight percent;
a gum base in a concentration from 5 weight percent to 95 weight percent;
wherein said gum base comprises an elastomer comprising a styrene-diene block copolymer; an elastomer plasticizer; and, between about 5 and about 50 weight percent filler; wherein said elastomer has a total styrene concentration between about 15 and about 40 weight percent, and wherein said styrene-diene block copolymer is present at a concentration of from about 2 weight percent to about 15 weight percent, based on total weight of said gum base.

11. The chewing gum of claim 10 further comprising a flavor.

12. The chewing gum of claim 10 further comprising a high intensity sweetener.

13. The chewing gum of claim 12 wherein the high intensity sweetener is selected from the group consisting of aspartame, sucralose, acesulfame-K, saccharin, thaumatin, alitame, neotame, cyclamate, perilla derived sweeteners, stevia derived sweeteners, monatin, monellin, chalcones, and combinations thereof.

* * * * *